United States Patent [19]

Priefert

[11] Patent Number: 5,109,802
[45] Date of Patent: May 5, 1992

[54] ANIMAL HEADGATE WITH AN AUTOMATIC LOCKING MECHANISM

[76] Inventor: William D. Priefert, P.O. Box 1540, Mt. Pleasant, Tex. 75455

[21] Appl. No.: 670,886

[22] Filed: Mar. 18, 1991

[51] Int. Cl.[5] ............................................. A61D 3/00
[52] U.S. Cl. ..................................................... 119/98
[58] Field of Search ................ 119/99, 98, 147.1, 148, 119/149, 150

[56] References Cited

U.S. PATENT DOCUMENTS

| | | | |
|---|---|---|---|
| 2,234,366 | 3/1941 | Carter | 119/98 |
| 2,678,631 | 5/1954 | Hagar | 119/99 |
| 3,245,383 | 4/1966 | Priefert | 119/98 |
| 4,476,815 | 10/1984 | Albers, Sr. | 119/148 |
| 4,632,063 | 12/1986 | Priefert | 119/98 |

*Primary Examiner*—Cary E. O'Connor
*Assistant Examiner*—Todd E. Manahan
*Attorney, Agent, or Firm*—Kent A. Herink; Brian J. Laurenzo

[57] ABSTRACT

An animal headgate has a rectangular frame in which a pair of neck-engaging yokes is mounted for coordinated sliding movement between a fully open position and a fully closed position. A parallelogram linkage interconnects each yoke to an associated sleeve on the rectangular frame so that movement of the sleeve between an upper and a lower position will move the yokes between the fully open and the fully closed position, respectively. An over-center spring arrangement urges the yokes from a neutral, open position toward the fully closed position. A unidirectional locking mechanism associated with each of the posts permits the spring arrangements to close the yokes about the neck of an animal but prevents unassisted opening of the yokes thereby restraining the animal. A notched bar and associated catch mounted on the upper end portions of the yokes provide for automatic operation of the headgate. The spring arrangements act to hold the notched bar in the catch at a preselected open position for the yokes. Opening pressure on the yokes from the shoulders of an animal that has inserted its head through the yokes will release the notched bar and permit the spring arrangement to move the yokes to engage the neck of the animal.

8 Claims, 4 Drawing Sheets

ANIMAL HEADGATE WITH AN AUTOMATIC LOCKING MECHANISM

BACKGROUND OF THE INVENTION

The invention relates to animal headgates and, more specifically, to an animal headgate that includes a pair of neck-engaging yokes mounted for coordinated horizontal sliding movement and including an automatic locking mechanism for holding the yokes in an animal-restraining position therefor.

In the practice of animal husbandry, particularly with livestock such as cattle, hogs and sheep, it is frequently necessary to restrain the animals during the performance of certain procedures. For example, male calves are typically castrated at an early age. They may also be branded, dehorned, and have ear tags attached. At various times it may also be necessary to administer medicines either by use of hypodermic syringes or orally. Headgates are commonly used to restrain the animal to facilitate all of the above procedures. Because these and other procedures may be performed at various time throughout the life cycle of the animal, it is important that the restraint device be adaptable for use on both young and fully grown animals.

Most known headgates require manual operation to accurately coordinate the closing of the headgate after the head of the animal but before the shoulders of the animal have extended through the headgate. This requires that the operator be stationed at the headgate at all times when an animal is to be restrained. Accordingly, a minimum of two people is required to effectively restrain an animal using conventional headgates—one person to operate the headgate and another to prod or chase the animal into position.

The present invention accommodates a wide variety of ages and sizes of livestock and is adaptable for automatic closing to enable a single operator to restrain an animal.

SUMMARY OF THE INVENTION

The invention consists of a headgate, which may be conveniently positioned at the end of a chute or similar enclosure, for engaging the neck of an animal to thereby restrain the animal so that a variety of animal husbandry procedures may be conveniently performed. The headgate includes a pair of generally upright frame posts spaced apart by at least the width of the animal. Top and bottom frame members interconnect the upright frame posts. A pair of animal neck-engaging yokes are mounted for horizontal sliding movements on the top and bottom frame members between a fully open position and a plurality of closed, neck-engaging positions. A parallelogram linkage interconnects each of the yokes with an associated sleeve that is mounted for vertical sliding movement on one of the upright frame posts. Accordingly, up-and-down movement of the sleeves will, respectively, open and close the yokes. Each of the parallelogram linkages includes an over-center spring arrangement that has a neutral position intermediate between the animal neck-engaging positions and the fully open position. The over-center spring arrangement will act to urge the yokes from the neutral position either toward the neck-engaging positions or the fully open position. Locking means is provided on each of the sleeves for preventing opening of the yokes by a restrained animal. An operating handle is provided for manual release of the locking mechanisms and opening of the yokes.

The headgate also has an automatic operation mode wherein the yokes are held open in a preset position and the force of an animal trying to squeeze through the yokes causes the yokes to close to a neck-engaging position. A notched bar is pivotally mounted at the upper end portion of one of the yokes and extends horizontally and through a catch on the other of the yokes. The yokes are adjusted by the operating handle to the desired intermediate open position and the catch is engaged in an appropriate notch of the notched bar. The spring arrangement holds the notched bar in the catch until it is released by the animal in the appropriate capture position with its neck between the yokes.

Accordingly, an object of the invention is to provide an animal headgate which accommodates young and fully grown livestock.

Another object of the invention is to provide a headgate which includes a pair of neck-engaging yokes mounted for cooperative horizontal sliding motion between an open position and a plurality of neck-engaging positions.

A further object of the invention is to provide a spring-biased parallelogram linkage for accomplishing the coordinated horizontal sliding movement of the yokes.

Yet another object of the invention is to provide an automatic locking mechanism which permits movement of the yokes toward the neck-engaging positions but prevents opening of the yokes by a restrained animal.

Yet a further object of the invention is to provide a locking mechanism for an animal headgate which is easily releasable, which experiences very little wear, and which does not require lubrication.

Still another object of the invention is to provide a headgate which will automatically close in response to pressure of an animal's shoulders on the neck-engaging yokes.

These and other objects of the invention will be readily understood from the following drawings, specifications, and claims.

DETAILED DESCRIPTION OF A PREFERRED EMBODIMENT

Figure 1:
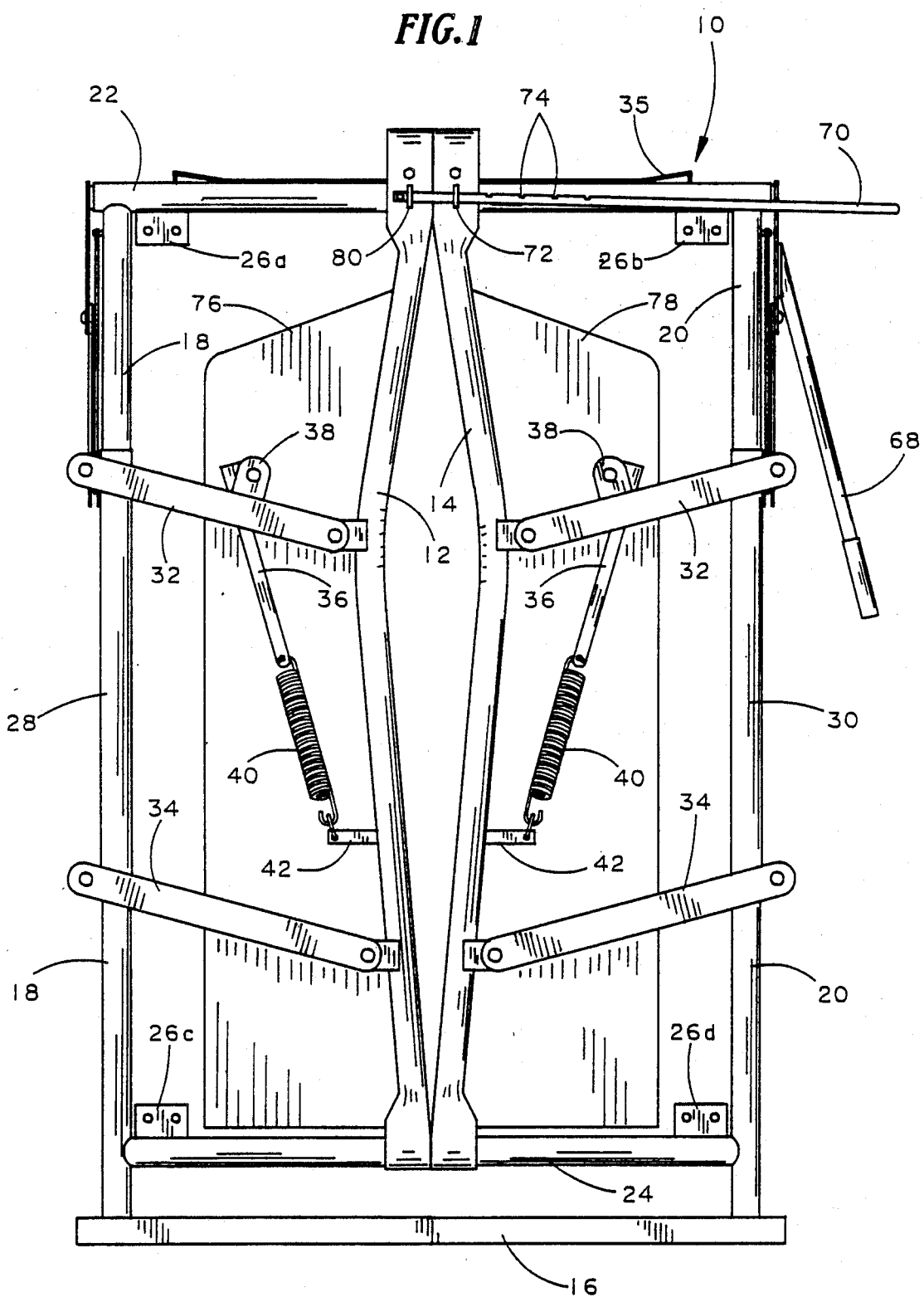
FIG. 1 is a front elevational view of the animal headgate shown in its fully closed position.

Illustrated in FIG. 1, generally at 10, is an animal headgate restraining device, including a pair of animal neck-engaging yokes 12 and 14 for restraining therebetween the neck of an animal rearwardly of the head and forwardly of the shoulders. The headgate 10 is supported on the ground on a horizontal support beam 16. Extended vertically from either end portion of the support beam 16 is one of a pair of upright frame posts 18 and 20. A tubular top frame member 22 interconnects the upper end portions of the upright frame posts 18 and 20. A horizontal lower or bottom frame member 24 interconnects the lower end portions of the upright frame posts 18 and 20 and is spaced above the support beam 16. At each of the four corners of the interconnected frame members, a mounting bracket 26a-d is attached for mounting the head gate 10 at the end of an animal chute or other enclosure from which the animal will be entering the headgate 10.

The neck-engaging yokes 12 and 14 are mounted for horizontal sliding movement on the top and bottom frame members 22 and 24 by way of elongated apertures (FIG. 7) at each end portion thereof. A pair of sleeves 28 and 30 are mounted one each on the upright frame posts 18 and 20, respectively, for relative vertical sliding movement thereon. A pair of parallelogram linkage systems, each of which consist of an upper link arm 32 and a parallel lower link arm 34, interconnect the sleeves 28 and 30 with the corresponding yokes 12 and 14. Each of the link arms 32 and 34 are pivotally mounted at one end portion to the sleeves and at the other end portion to the yokes so that upon up-and-down vertical motion of the sleeves 28 and 30 on the upright frame posts 18 and 20, the yokes 12 and 14 will be moved between a fully open position (FIG. 2) and a fully closed position (FIG. 1). The parallelogram linkages serve to maintain the vertical orientation of each of the yokes 12 and 14 as they travel horizontally in sliding movement on the top and bottom frame members 22 and 24. Each of the elongated apertures at the upper end portion of the yokes 12 and 14 support a roller 33 which rides upon a strap 35 supported above the tubular frame member 22. This arrangement will accommodate some relative misalignment without causing binding of the end portions of the yokes on the horizontal frame members.

An over-center spring arrangement is employed on each parallelogram linkage and yoke for urging the yokes between a neutral position and either the fully closed or fully open position. Each over-center spring arrangement includes a spring linkage strap 36 that is pivotally mounted above the upper linkage arm 32 on a mounting ear 38. A coil spring 40 interconnects the lower end portion of the spring linkage strap 36 to an ear member 42 that extends horizontally outwardly from the corresponding yoke 12 or 14. In the closed positions, one of which is illustrated in FIG. 1, the springs 40 are under tension and are acting to urge the yokes 12 and 14 toward the fully closed position. As the sleeves 28 and 30 are moved upwardly so as to open the yokes 12 and 14 toward the fully open position (FIG. 2), the spring arrangements will move toward a neutral position wherein the force of the springs 40 exert neither opening nor closing force or pressure on the yokes. If the yokes are moved outwardly past the neutral position, the over-center spring arrangements result in the tension in the springs 40 causing the yokes to move from the neutral position to the fully open position of FIG. 2.

Figure 3:
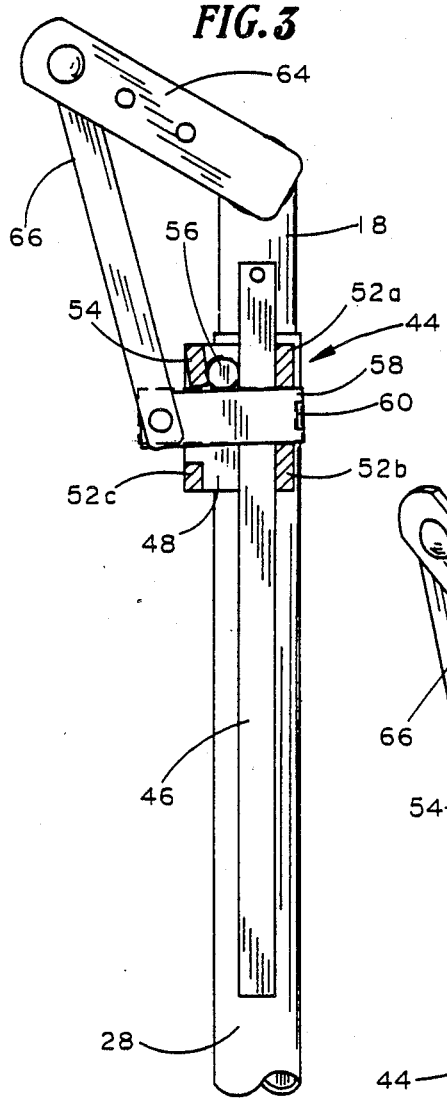
FIG. 3 is an enlarged detail view of the upper end portion of an upright post of the headgate and showing in cross-section the locking mechanism.
Figure 4:
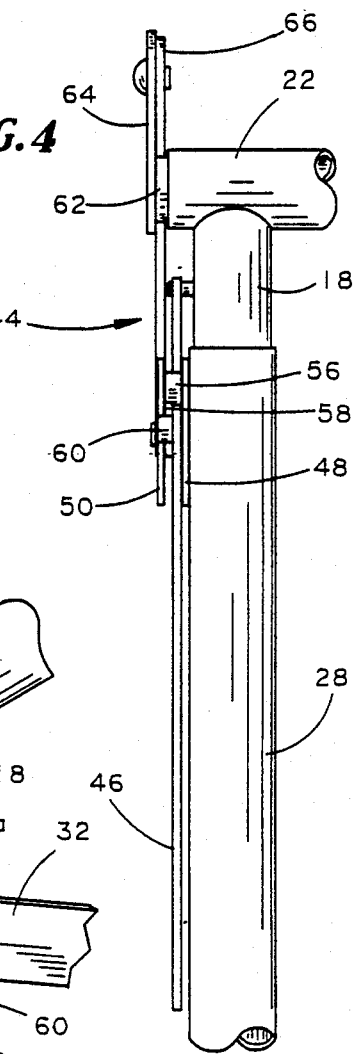
FIG. 4 is an enlarged detail front view corresponding to FIG. 3.
Figure 5:
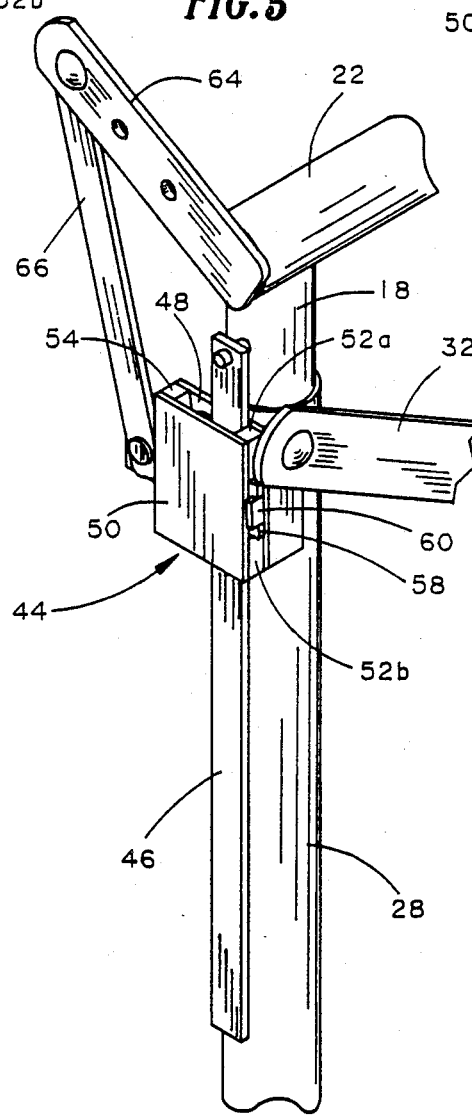
FIG. 5 is an enlarged detail perspective view corresponding to FIG. 3.

To prevent undesired opening of the yokes, a locking mechanism, illustrated generally at 44 in FIGS. 3-5, is mounted on each of the sleeves 28 and 30, with only the side of the headgate 10 including sleeve 28 and post 18 being shown for simplicity of illustration. The lock mechanism 44 operates in association with a lock bar 46 consisting of a hardened steel band secured at its upper end portion to the post 18. The lock bar 46 extends downwardly parallel to the post 18 and the sleeve 28, being spaced uniformly from the sleeve 28 by a distance sufficient to accommodate the locking mechanism 44.

The locking mechanism 44 includes a back plate 48 which is secured to the upper end portion of the sleeve 28. A front plate 50 is attached and held generally parallel to the back plate 48 by three spacing blocks 52a-c and an inclined trapping member or sloper block 54. A hardened roller 56 rides in the space between the trapping member 54 and the lock bar 46. The lock mechanism 44 is free to move downwardly relative to the lock bar 46 in that the roller 56 is moved upwardly and is free to rotate between the sloper block 54 and the lock bar 46. Upward movement of the lock mechanism 44 relative to the lock bar 46 will permit the roller 56 to fall until it is trapped between the sloper block 54 and the lock bar 46 whereupon it will bind and prevent further upward movement of the lock mechanism 44. A release lever 58 for lifting and releasing the roller 56 is supported between the plates 48 and 50 of the locking mechanism 44 for pivotal movement at a notched end portion thereof on a mounting tab 60 secured to the front face 50.

It is to be noted that when the headgate 10 is in a neck-engaging position thereof the parallelogram linkages direct outward pressure that may be present on the yokes, e.g., from a restrained animal that is struggling in the headgate, onto the lock mechanisms in an outward direction substantially normal or perpendicular to the vertical frame posts. Accordingly, little of the pressure on the yokes will act to push upwardly on the lock mechanisms so that the lock mechanisms will not be required to resist the full force of the struggling animal to hold the yokes in the neck-engaging position.

The tubular top frame member 22 receives for axial pivotal movement therein a synchronizing turn shaft 62 on an end portion of which is secured a lock release arm 64. An interconnecting link 66 is pivotally attached to the free end portion of the lock release arm 64 and the free end portion of the lock release lever 58. Accordingly, pivotal motion of the lock release arm 64 will also act to pivot the lock release lever 58. As illustrated in broken lines in FIG. 3, upward pivotal movement of the lock release lever will raise the roller 56 so that it will be free to rotate even upon upward movement of the lock mechanism 44 relative to the lock bar 46. In this way, pivotal movement of the synchronizing turn shaft 62 is used to release the lock mechanism 44 so that the sleeves 28 and 30 can be raised and, correspondingly, the yokes 12 and 14 can be opened.

Figure 6:
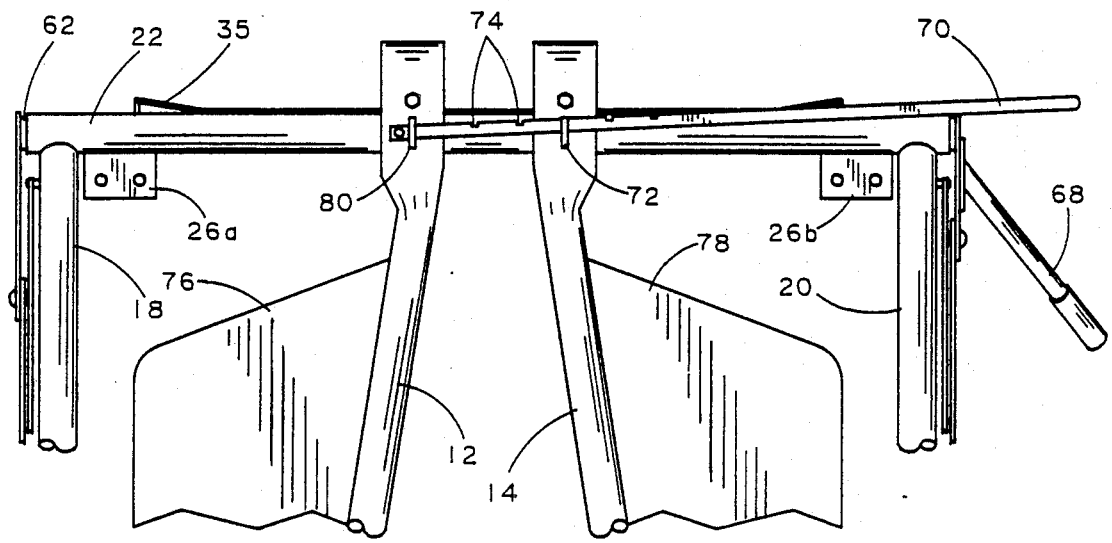
FIG. 6 is a partial front view of the headgate in the automatic operation mode and showing a notched bar for holding the neck-engaging yokes in a preset position.
Figure 7:
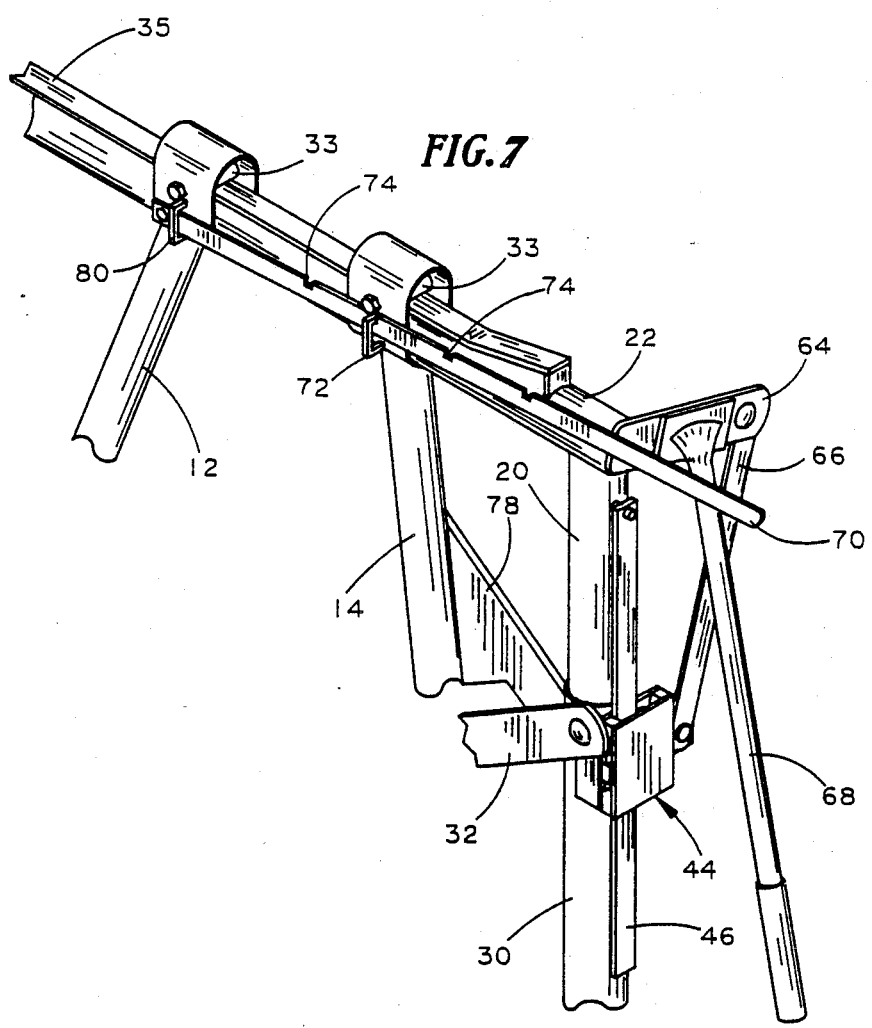
FIG. 7 is a partial perspective view of the upper portion of the headgate in the automatic operation mode corresponding to FIG. 6.

Pivotal movement of the synchronizing turn shaft 62 is accomplished by operation of a control handle 68, an end portion of which is secured to one of the lock release arms 64 (FIG. 7). When the handle 68 is mounted adjacent the right hand frame post 20 (FIGS. 1, 2, 6 and 7), clockwise movement of the handle 68 will initially lift the release levers 58 on each of the lock mechanisms 44. Additional clockwise pivotal movement of the handle 68 will thereafter lift the locking mechanisms 44 and sleeves 28 and 30 by engagement of the release levers 58 with the sloper blocks 54. The handle 68 can, accordingly, be used to either lift or lower the sleeves 28 and 30 and thereby open or close, respectively, the yokes 12 and 14.

Manual operation of the headgate 10 is accomplished by stationing an operator at the handle 68. The operator will hold the yokes 12 and 14 in an intermediate open position sufficient at least to allow insertion of the head of the animal and so that the animal will not be unduly discouraged from attempting to pass through the headgate 10. When the head of the animal passes the yokes but while the shoulders of the animal are still behind the yokes, the operator will forcefully lower the handle 68 to move the yokes 12 and 14 to engage the neck of the animal. Alternatively, the handle 68 can be released, whereupon the spring biasing arrangement will act to move the yokes to the neck-engaging position. In either situation, the one-way action of the locking mechanisms will prevent opening of the yokes so that the yokes will only close until they closely engage the neck of the restrained animal.

Figure 2:
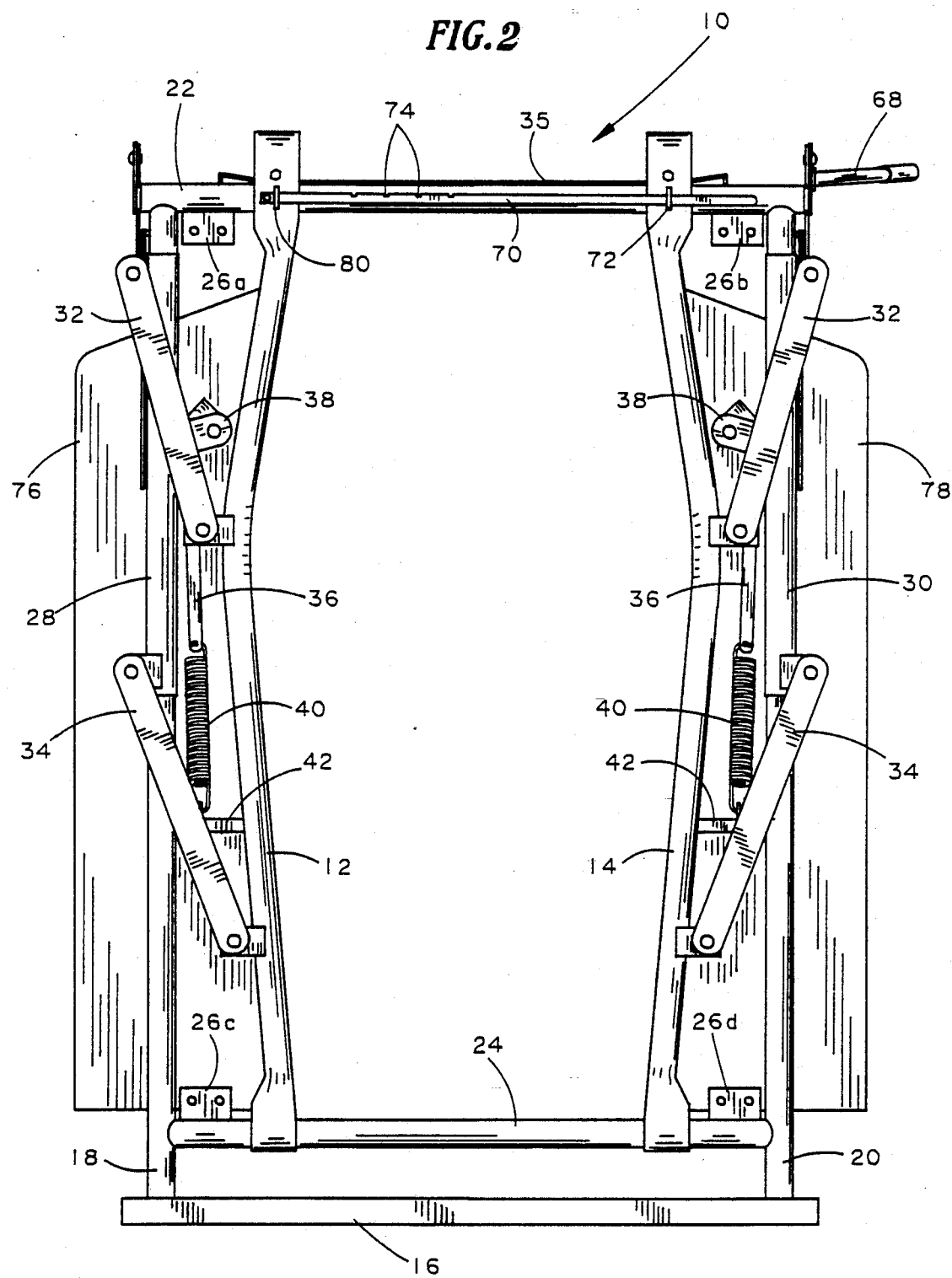
FIG. 2 is a front elevational view of the headgate of FIG. 1 shown in its fully open position.

The headgate 10 is also adapted for automatic operation. A notched bar 70 (FIGS. 6 and 7) is pivotally attached at an end portion thereof to the upper end portion of one of the yokes 12. The notched bar 70 extends substantially horizontally and through a catch member 72 that is mounted on the upper end portion of the other of the yokes 14. A plurality of notches 74 in the top edge of the notched bar 70 are adapted for releasable engagement with the catch 72. Gravity ordinarily acts to pivot the notched bar 70 downwardly so that the bottom edge thereof rests in the catch 72 (FIG. 2). The over-center spring arrangements, as described above, act to urge the yokes from the neutral position toward the closed position. Accordingly, if the yokes 12 and 14 are adjusted by use of the operating handle 68 to a position wherein the notched bar 70 can be upwardly pivoted to capture the catch 72 in one of the notches (e.g., the second inward position notch as illustrated in FIGS. 6 and 7), the spring arrangements will provide sufficient force to hold the notched bar 70 in the upward or suspended position.

The operator will adjust the separation distance of the yokes 12 and 14 such that the head of the animal to be restrained can pass through the yokes but not the animal's shoulders. The notched bar 70 is then pivoted upwardly by the operator to engage the catch 72 in the appropriate notch. The operator is then free to leave the headgate and chase or prod the animal toward the headgate. One of a pair of shields 76 and 78 is mounted on a corresponding one of the yokes 12 and 14 to block the animal from attempting to pass through the headgate other than between the yokes. After the animal has inserted its head between the yokes 12 and 14 and is attempting to pass through the headgate, its shoulders will contact one or both of the yokes thereby exerting opening pressure. This pressure will act to reduce the inward or closing pressure of the spring arrangements and the notched bar 70 will be released from capture by the catch 72 whereupon it will pivot downwardly to the bottom of the catch 72. The spring arrangements will now be free to urge the yokes inwardly. Because the locking mechanisms permit only inward movement of the yokes, the yokes will move to closely engage the neck of the animal so as to prevent it from escaping the headgate by withdrawing its head.

The notched bar 70 is shown pivotally mounted to the yoke 12 when the operating handle 68 is associated with the upright frame post 20. The headgate may also be operated, in either the manual or automatic mode, from the other side by moving the operating handle 68 to the other end of the synchronizing shaft 62 and by attaching the notched bar 70 to the yoke 14 such that it extends toward the operating handle 68 and through a catch member 80 on the yoke 12.

While a particular embodiment of the invention has been shown and described, it will be obvious to those skilled in the art that changes and modifications may be made without departing from the true spirit and scope of the invention as described in the following claims.

I claim:

1. A headgate for restraining animals, comprising:
    (a) a pair of generally upright frame members spaced apart by at least the width of said animal;
    (b) top and bottom frame members extended between said upright frame members at the top and bottom thereof, respectively;
    (c) a pair of animal neck-engaging yokes mounted for sliding movement on said top and bottom frame members between a fully open position and a fully closed position;
    (d) a pair of sleeves, one each of which is associated with each of said upright frame members, for sliding movement thereon between an upper position and a lower position;
    (e) linkage means interconnecting each of said yokes with an associated one of said sleeves such that as said sleeve is moved between said upper position and said lower position, the associated one of said yokes is moved between said fully open position and said fully closed position, respectively;
    (f) spring biasing means for urging said yokes toward said fully closed position;
    (g) locking means for preventing unassisted opening of said yokes; and (h) manually operable means for releasing said locking means and to raise said sleeves thereby opening said yokes.

2. A headgate for restraining animals as defined in claim 1, further comprising:
    (i) means for releasably holding said yokes at a preselected intermediate open position wherein said yokes are separated by a width greater than the head of the animal but less than the shoulders of the animal and wherein said holding means is released by opening pressure by the animal on said yokes whereupon said spring biasing means moves said yokes toward said fully closed position to closely engage the neck of the animal therebetween and restrain the animal.

3. A headgate for restraining animals as defined in claim 2, wherein said releasable holding means comprises:
    (1) a bar pivotally attached at one end portion thereof to one of said yokes;
    (2) a catch mounted on the other of said yokes including an opening through which passes the other, free end portion of said bar; and
    (3) one or more notches on the upper side of said bar for releasable engagement with said catch.

4. A headgate for restraining animals as defined in claim 1, wherein said locking means comprises:
    (1) a generally upright bar mounted on said upright frame member;
    (2) a trapping member inclined relative to said bar;
    (3) a roller mounted for rolling movement between said bar and said trapping member;

(4) wherein said roller becomes trapped between said trapping member and said bar upon upward movement of the locking means; and (5) a release member for lifting said roller out of said trapped position to permit upward movement of the locking means.

5. A headgate for restraining animals as defined in claim 4, wherein said locking means is mounted on at least one of said sleeves and the horizontal component of forces acting on said locking means as a result of pressure by a restrained animal on said yokes is greater than the vertical component of such forces.

6. A headgate for restraining animals as defined in claim 5, wherein said manually operable means comprises:

(1) a transverse shaft mounted for longitudinal axial pivotal movement inside said top frame member;

(2) a radially extended ear mounted on an end portion of said shaft;

(3) a handle mounted on said ear for pivotally moving said shaft; and (4) a bar member interconnecting the free end portion of said ear and said release member.

7. A headgate for restraining animals as defined in claim 1, wherein said linkage means comprises:

(1) a upper linkage member pivotally attached at a first end portion to an upper end portion of one of said sleeves and pivotally attached at a second end portion to the associated one of said yokes; and (2) a lower linkage member pivotally attached at a first end portion to the lower end portion of said one of said sleeves and pivotally attached at a second end portion to said one of said yokes;

(3) whereby said linkage members and said one of said sleeves and said yokes forms a parallelogram linkage system.

8. A headgate for restraining animals as defined in claim 7, wherein said spring biasing means comprises:

(1) an ear mounted on said upper linkage member; and (2) a spring mounted under tension between said ear and a position on said one of said yokes intermediate said upper and lower linkage members.

* * * * *